United States Patent
Kishore et al.

(10) Patent No.: US 7,483,757 B2
(45) Date of Patent: Jan. 27, 2009

(54) CONTROL SYSTEM MIGRATION

(75) Inventors: Ravindra Kishore, Bellendur Post Bangalore (IN); Mahesh K. Joshi, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 282 days.

(21) Appl. No.: 11/188,296

(22) Filed: Jul. 22, 2005

(65) Prior Publication Data

US 2007/0021852 A1 Jan. 25, 2007

(51) Int. Cl.
*G05B 19/42* (2006.01)

(52) U.S. Cl. .......................................... 700/87; 700/86

(58) Field of Classification Search ................... 700/18, 700/23, 86, 87, 88, 181, 253; 717/100, 110, 717/121, 141–143, 165, 168, 172, 174; 707/4, 707/203–204; 709/201, 220–222; 716/1, 716/3–4

See application file for complete search history.

(56) References Cited

U.S. PATENT DOCUMENTS

| | | | | |
|---|---|---|---|---|
| 5,452,239 | A * | 9/1995 | Dai et al. ....................... 703/19 |
| 5,491,818 | A * | 2/1996 | Malatesta et al. ........... 707/201 |
| 5,613,111 | A | 3/1997 | Malatesta et al. |
| 5,729,536 | A | 3/1998 | Doshi et al. |
| 5,787,433 | A * | 7/1998 | Plotkin et al. ................ 707/101 |
| 5,937,174 | A | 8/1999 | Weber et al. |
| 6,151,608 | A * | 11/2000 | Abrams ....................... 707/204 |
| 6,256,773 | B1 * | 7/2001 | Bowman-Amuah ......... 717/121 |
| 6,324,647 | B1 * | 11/2001 | Bowman-Amuah .......... 726/23 |
| 6,334,215 | B1 | 12/2001 | Barker et al. |
| 6,370,573 | B1 * | 4/2002 | Bowman-Amuah ......... 709/223 |
| 6,405,364 | B1 * | 6/2002 | Bowman-Amuah ......... 717/101 |
| 6,418,461 | B1 | 7/2002 | Barnhouse et al. |
| 6,477,641 | B2 * | 11/2002 | Davis et al. .................. 712/241 |
| 6,536,037 | B1 * | 3/2003 | Guheen et al. .............. 717/151 |

(Continued)

FOREIGN PATENT DOCUMENTS

EP 0801513 A1 10/1997

(Continued)

OTHER PUBLICATIONS

Vertical migration of software functions and algorithms using enhanced microsequencing Papachristou, C.A.; Immaneni, V.R.; Computers, IEEE Transactions on vol. 42, Issue 1, Jan. 1993 pp. 45-61 Digital Object Identifier 10.1109/12.192213.*

(Continued)

*Primary Examiner*—Michael B. Holmes
(74) *Attorney, Agent, or Firm*—Schwegman, Lundberg & Woessner, P.A.

(57) ABSTRACT

A migration system for distributed control system migration uses a parser that parses system configuration information for a source control system into an intermediate language. A block equivalence module then finds destination system control blocks that are equivalent to source system control blocks and builds logical control loops using the destination system control blocks. In one embodiment, some source system control block may be migrated to two destination system control blocks. Selected source system control blocks may have integrated alarms. Such control blocks may be migrated to control blocks with separate alarms blocks.

20 Claims, 5 Drawing Sheets

U.S. PATENT DOCUMENTS

| | | | |
|---|---|---|---|
| RE38,104 E * | 4/2003 | Gosling | 717/140 |
| 6,560,596 B1 | 5/2003 | Margulies et al. | |
| 6,615,166 B1 * | 9/2003 | Guheen et al. | 703/27 |
| 6,662,357 B1 * | 12/2003 | Bowman-Amuah | 717/120 |
| 6,724,757 B1 * | 4/2004 | Zadikian et al. | 370/388 |
| 6,728,884 B1 | 4/2004 | Lim | |
| 6,728,950 B2 * | 4/2004 | Davis et al. | 717/136 |
| 6,766,520 B1 | 7/2004 | Rieschl et al. | |
| 6,856,600 B1 * | 2/2005 | Russell et al. | 370/244 |
| 6,909,708 B1 * | 6/2005 | Krishnaswamy et al. | 370/352 |
| 6,911,916 B1 * | 6/2005 | Wang et al. | 340/825 |
| 6,922,665 B1 * | 7/2005 | Guccione et al. | 703/14 |
| 6,982,974 B1 * | 1/2006 | Saleh et al. | 370/386 |
| 7,082,340 B2 * | 7/2006 | Fehrer et al. | 700/83 |
| 7,096,434 B2 * | 8/2006 | Roesner et al. | 716/1 |
| 7,103,883 B2 * | 9/2006 | Davis et al. | 717/152 |
| 7,139,999 B2 * | 11/2006 | Bowman-Amuah | 717/101 |
| 2002/0107871 A1 | 8/2002 | Wyzga et al. | |
| 2002/0138570 A1 * | 9/2002 | Hickey | 709/204 |
| 2002/0141582 A1 | 10/2002 | Kocher et al. | |
| 2002/0156792 A1 | 10/2002 | Gombocz et al. | |
| 2002/0180792 A1 | 12/2002 | Broussard | |
| 2003/0018573 A1 | 1/2003 | Comas et al. | |
| 2003/0167434 A1 | 9/2003 | Fischer | |
| 2004/0010521 A1 | 1/2004 | Li et al. | |
| 2004/0042509 A1 * | 3/2004 | Gallant et al. | 370/522 |
| 2004/0054808 A1 | 3/2004 | Ekberg | |
| 2004/0062267 A1 | 4/2004 | Minami et al. | |
| 2004/0128139 A1 | 7/2004 | Ilan et al. | |
| 2004/0158820 A1 | 8/2004 | Moore et al. | |
| 2005/0085928 A1 * | 4/2005 | Shani | 700/18 |
| 2006/0168013 A1 * | 7/2006 | Wilson et al. | 709/206 |

FOREIGN PATENT DOCUMENTS

| | | |
|---|---|---|
| EP | 0907917 B1 | 7/2000 |
| FR | 2752347 A1 | 2/1998 |
| WO | WO-9641258 A1 | 12/1996 |
| WO | WO-9800776 A1 | 1/1998 |
| WO | WO-9843150 A2 | 10/1998 |
| WO | WO-9937059 A1 | 7/1999 |
| WO | WO-9939541 A2 | 8/1999 |
| WO | WO-9952047 A1 | 10/1999 |
| WO | WO-0013081 A2 | 3/2000 |
| WO | WO-0055767 A2 | 9/2000 |
| WO | WO-0133349 A2 | 5/2001 |
| WO | WO-0167789 A2 | 9/2001 |
| WO | WO-0178287 A2 | 10/2001 |
| WO | WO-0197099 A1 | 12/2001 |
| WO | WO-02054171 A2 | 7/2002 |
| WO | WO-02075931 A1 | 9/2002 |
| WO | WO-02077815 A2 | 10/2002 |
| WO | WO-02079906 A2 | 10/2002 |
| WO | WO-02101510 A2 | 12/2002 |
| WO | WO-03090092 A1 | 10/2003 |
| WO | WO-03105011 A1 | 12/2003 |
| WO | WO-2004021640 A1 | 3/2004 |

OTHER PUBLICATIONS

Experimental validation of a backpropagation algorithm for three-dimensional breast tumor localization Hanli Liu; Matson, C.L.; Lau, K.; Mapakshi, R.R.; Selected Topics in Quantum Electronics, IEEE Journal of vol. 5, Issue 4, Jul.-Aug. 1999 pp. 1049-1057 Digital Object Identifier 10.1109/2944.796329.*

RFID-Based Desktop Migration System Hwang, Taein; Park, Hojin; Chung, Jin Wook; Consumer Electronics, 2007. ISCE 2007. IEEE International Symposium on Jun. 20-23, 2007 pp. 1-5 Digital Object Identifier 10.1109/ISCE.2007.4382232.*

Mobile Agents Based Distributed Parallel Migration Liu, Qi-Cheng; Song, Yi-Bin; Machine Learning and Cybernetics, 2007 International Conference on vol. 1, Aug. 19-22, 2007 pp. 61-65 Digital Object Identifier 10.1109/ICMLC.2007.4370116.*

Design and Implementation of the Automated Desktop Migration System Using RFID Taein Hwang; Hojin Park; Jin Wook Chung; Advanced Communication Technology, The 9th International Conference on vol. 1, Feb. 12-14, 2007 pp. 155-156 Digital Object Identifier 10.1109/ICACT.2007.358327.*

A Virtual Machine Migration System Based on a CPU Emulator Onoue, Koichi; Oyama, Yoshihiro; Virtualization Technology in Distributed Computing, 2006. VTDC 2006. First International Workshop on Nov. 17-17, 2006 pp. 3-3 Digital Object Identifier 10.1109/VTDC.2006.2.*

A New Algorithm for Improved Dip/Sag Detection with Application to Improved Performance of Wind Turbine Generators Barendse, P.; Naidoo, R.; Douglas, H.; Pillay, P.; Industry Applications Conference, 2006. 41st IAS Annual Meeting. Conference Record of the 2006 IEEE vol. 1, Oct. 2006 pp. 118-123 Digital Object Identifier 10.1109/IAS.2006.2.*

Distributed Parallel Migration Computing Based on Mobile Agents Qicheng Liu; Xiaohong Chen; Mobile Technology, Applications and Systems, 2005 2nd international Conference on Nov. 15-17, 2005 pp. 1-5.*

* cited by examiner

CONTROL SYSTEM MIGRATION

BACKGROUND

Migration from older distributed control systems, such as industrial process control systems to new distributed control systems has been a tedious proposition. In some cases, the new system is designed from scratch to implement the existing process. This can take a significant amount of time, and result in a new system that needs to be extensively tested to make sure that it is functionally equivalent, or at least works as well as the prior system.

SUMMARY

A migration system for distributed control system migration uses a parser that parses system configuration information for a source control system into an intermediate language. A block equivalence module then finds destination system control blocks that are equivalent to source system control blocks and builds logical control loops using the destination system control blocks. In one embodiment, some source system control block may be migrated to a combination of two destination system control blocks. For example, selected source system control blocks may have integrated alarms. Such control blocks may be migrated to control blocks with separate alarms blocks, as supported in the destination system.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

Figure 1:
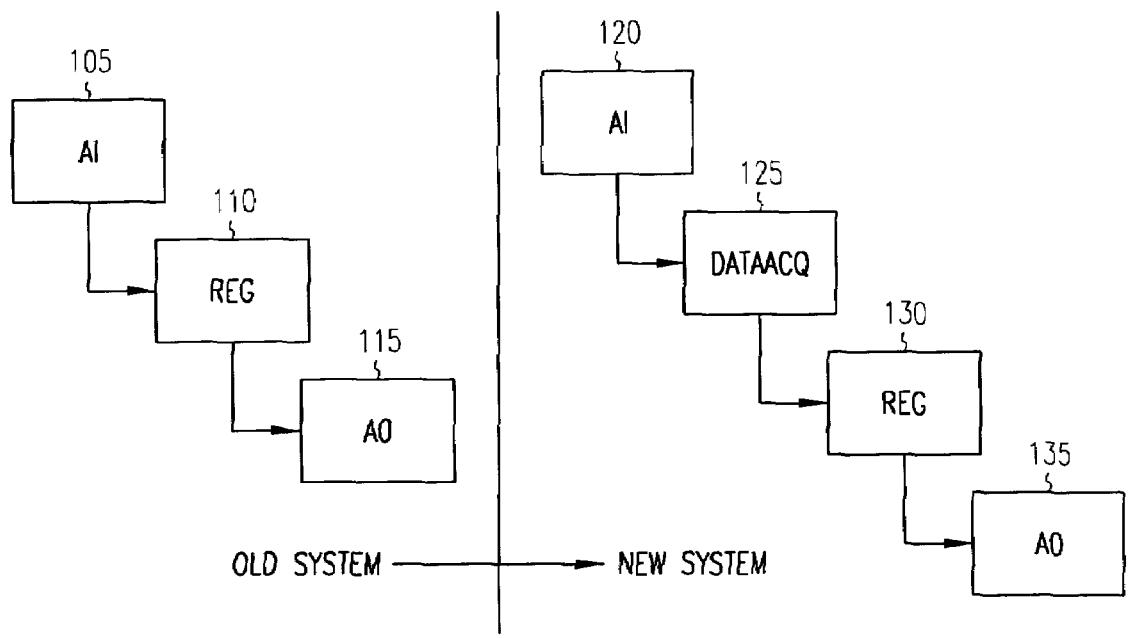
FIG. 1 is a block diagram of an example migration for an old distributed control system to a distributed new control system according to an example embodiment.

FIG. 1 illustrates a simple example of migration between different process control systems. An older control system is illustrated in FIG. 1 on the left side of the figure. It has blocks 105, 110 and 115. Block 105 in this embodiment is an analog input block. Block 110 is a regulatory control block, and block 115 is an analog output block. In one embodiment, system configuration information, such as control blocks may be expressed as text EB files (i.e. system configuration files), which are parsed and stored as old system information in a database. An algorithm, referred to as a connection engine, is applied to the old system information by reading the EB files (i.e. system configuration files), and converting them to a predefined intermediate format, which is stored in a database. Rules are then applied to first find equivalent blocks, which in one embodiment, may be expressed as XML files (i.e. system configuration files), which may also be stored in database. The algorithm is tailored to each new system to be migrated to, and works by specifying the connection logic between control blocks.

In one embodiment, the new system is a Honeywell Inc., Experion PKS control strategy process control system, and the old system is an older control system, which may be a Honeywell system, or other system. Other candidates for migration include HPM, APM, PM, TDC-2000 boxes, HG boxes, PMx, PMD and MxOpen.

Older systems may have analog control points. Alarm features may have been embedded in older systems, but may be separately dealt with in new systems. These functional differences should be accounted for in a migration from the old system to a new system.

Blocks may be thought of as functional blocks, which implement algorithms, such as a PID (proportional/integral/derivative) algorithm. To find an equivalent to an older functional block may require the use of one or more blocks in the new system.

In the embodiment illustrated in FIG. 1, there is no single equivalent block for block 105, but instead, two blocks provide equivalent functions, AI block 120 and DATAACQ block 125. In one embodiment, block 125 supports an alarm feature alone. The combination of block 120 and block 125 provide an equivalent feature as in block 105. A regulatory control block 130 was found equivalent to block 110, and an output block AO 135 was found equivalent to block 115.

The above algorithm is also referred to as a set of block equivalence rules. Block equivalence rules result in replacing source system blocks with destination systems blocks. It introduces extra blocks conditionally. For example, an alarm feature may be embedded in AI point of the prior system. Since alarms are treated as separate blocks in a new system, the rule results in introduction of additional blocks.

There are also a set of pin connection rules that may be applied to connect the resulting blocks to manage pin connections between blocks during migration. It may provide alternative unused pin if the pin is not available for uses.

A set of merge rules provide the ability to reduce the number of modules required for migration. The merge rules may result in a merger of blocks without disturbing the interconnections between blocks and functionalities of the blocks.

Further details regarding the algorithm are now discussed with reference to FIG. 2A, where an older system 200 is migrated to a new system 205. The older system 200 in one embodiment is for example a Honeywell TDC system, and new system 205 is for example a Honeywell Experion system. The older system consists of blocks 210, AI and 215, RegCtlB. A parameter, referred to as PV connects both the blocks. New system 205 comprises an AI block 220, DACQ or DATAACQ block 225 and RegCtlB block 230. The block equivalence rules were applied to get an equivalent to AI block 210 in the new system: AI(old)=AI (new)+DATAACQ (new). The block equivalence rules also provided RegCtlB (old)=RegCtl.PID(new), were PID refers to proportional, integral, derivative control.

Figure 2A:
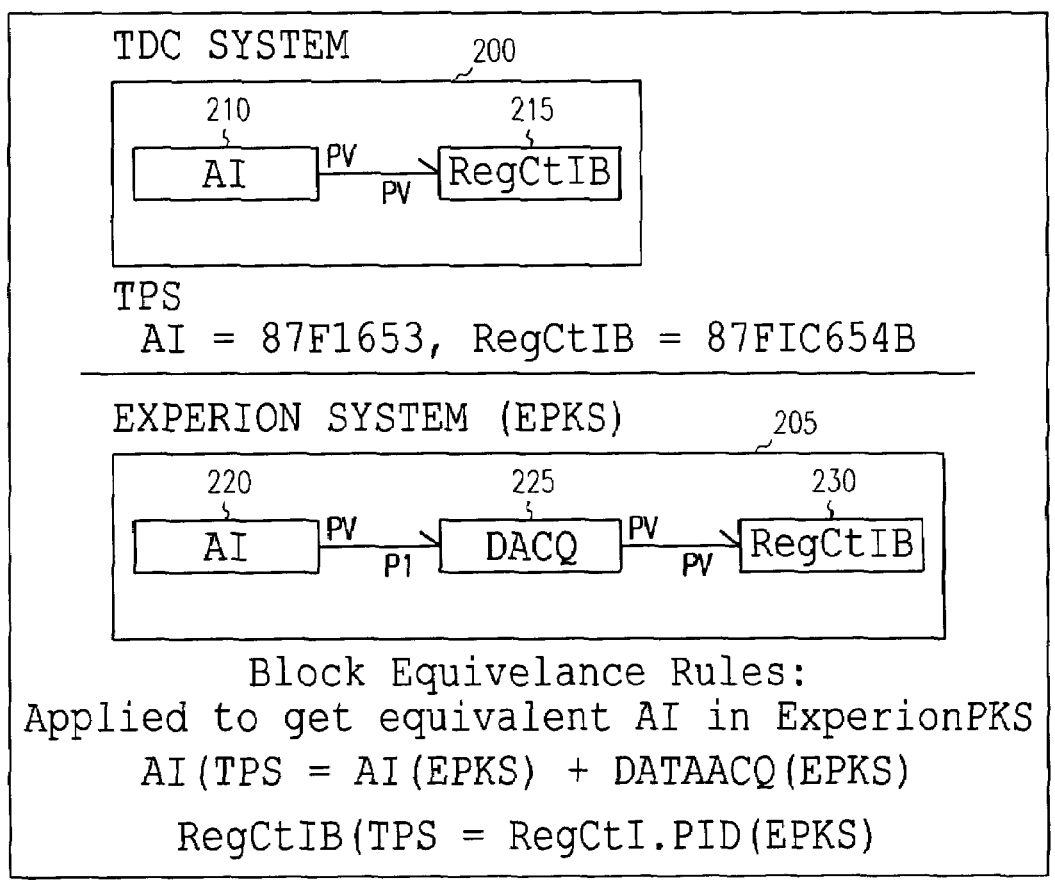
FIG. 2A is a block diagram of a further example migration for an old control system to a new control system according to an example embodiment.
Figure 2B:
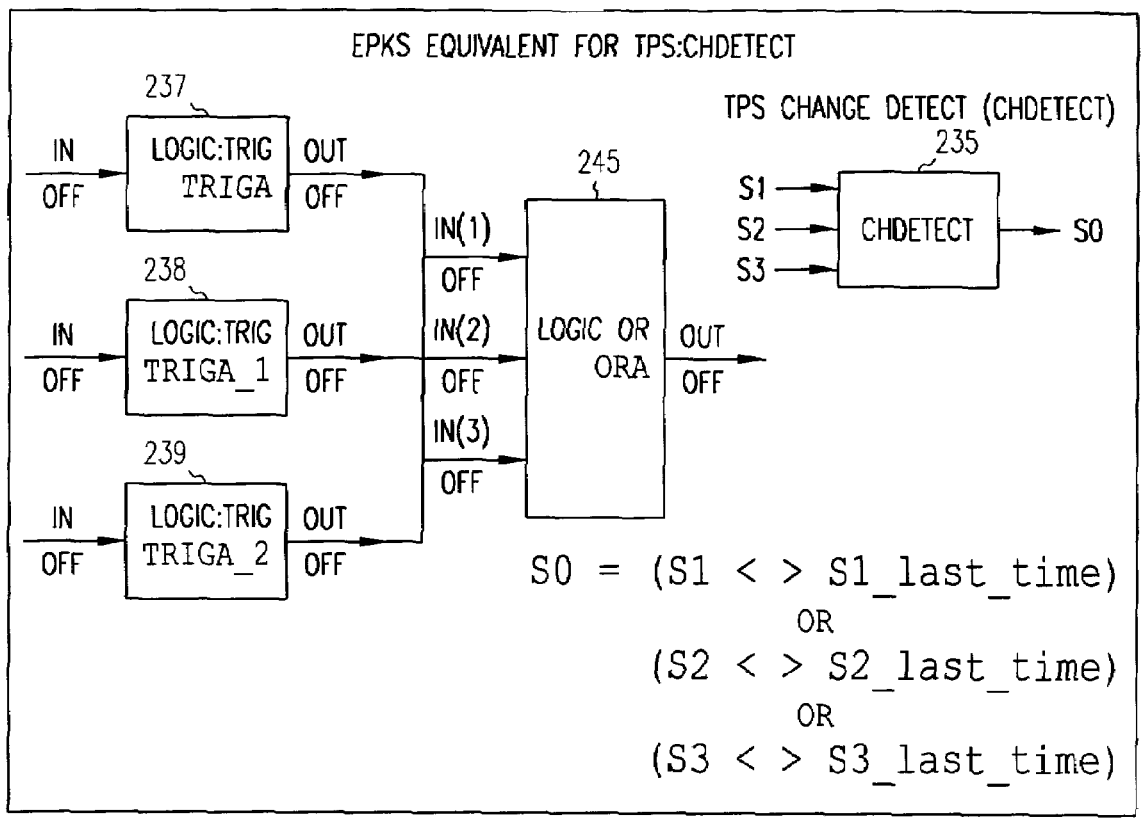
FIGS. 2B and 2C illustrate the migration of source control blocks into multiple destination system control blocks according to an example embodiment.
Figure 2C:
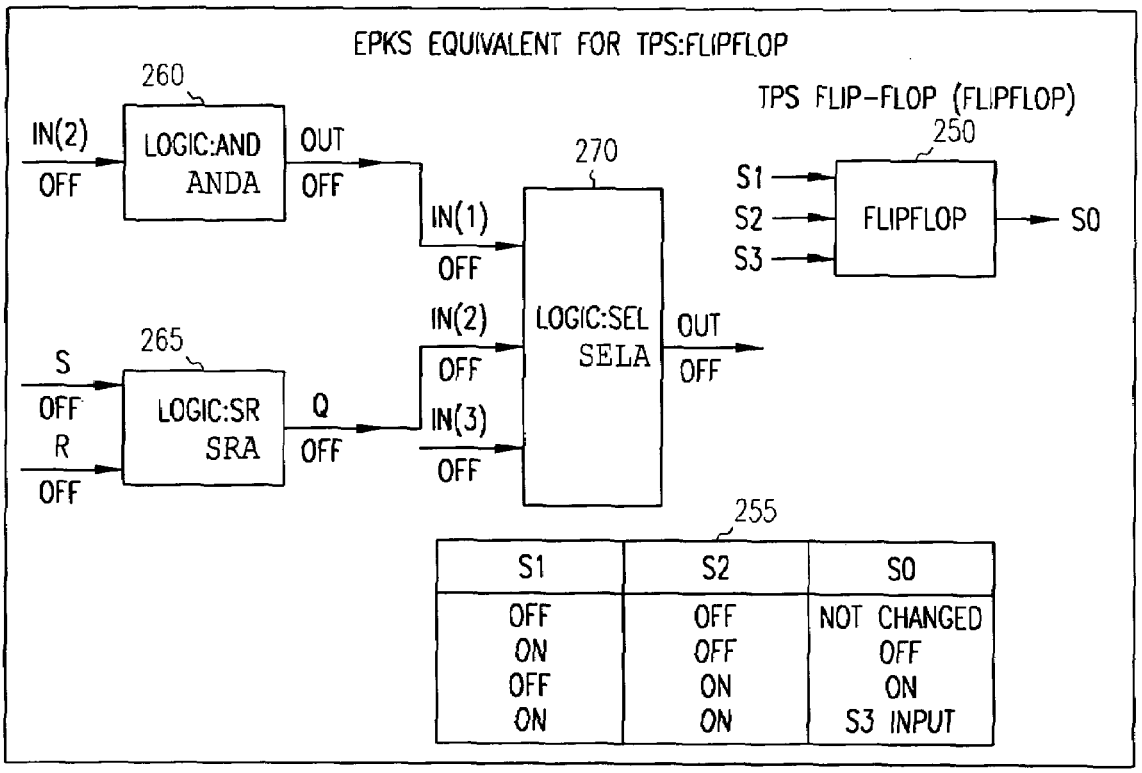

FIGS. 2B and 2C illustrate the migration of source control blocks into multiple destination system control blocks. In FIG. 2B, a source control block 235 is a CHDETECT control block, which is used by a TPS system to detect changes in up to three inputs, S1, S2 and S3, and provides an output SO. The destination system uses three trigger blocks (TRIGA, TRIGA_1, and TRIGA_2) 237, 238 and 239 to respectively receive the three inputs. Outputs from the trigger blocks are provided to an OR block 245, which provides an output equivalent to output SO of block 235 of the source system.

In FIG. 2C, a FLIPFLOP control block 250 provides a flip flop function as illustrated by logic represented in table 255, comparing two inputs, S1 and S2. An input S3 is provided by block 250 if both input S1 and S2 are on. The EPKS system equivalent for such a TPS:FLIPFLOP is a combination of one AND block 260, one SR block 265 and one SEL block 270. Input S1 is passed to a first input of AND block 260 and an input, R, of SR block 265. Input S2 is passed to a second input of AND block 260 and an input, S, of SR block 265. The output of AND block 260 is provided to a G input of SEL block 270, and the output of SR block 265 is provided to a "1" input of SR block 265. SR block 265 also receives S3 as an input at a "2" input. The output of SEL block 270 is equivalent to output SO of FLIPFLOP 250.

Figure 3:
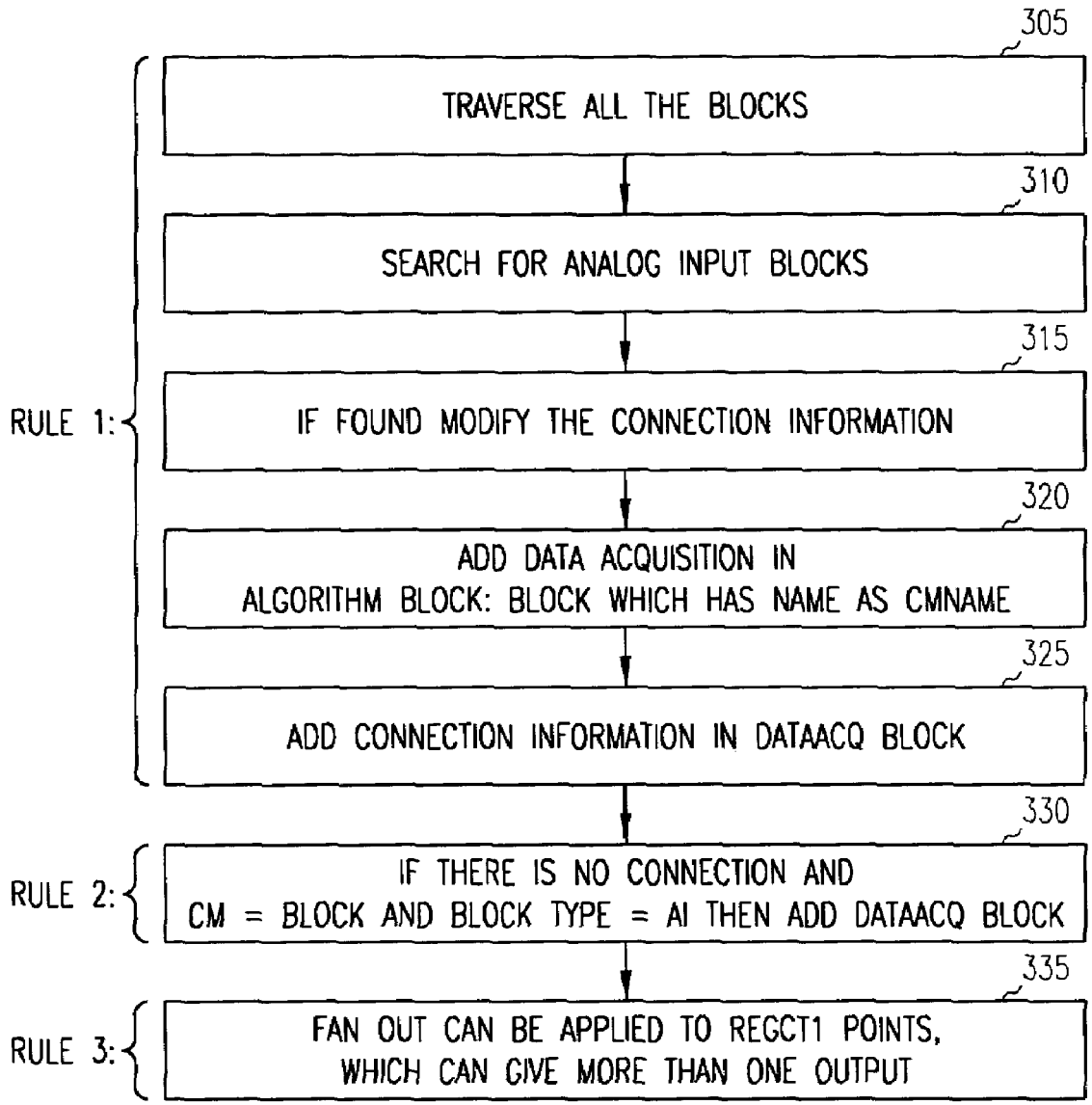
FIG. 3 is a flow chart of a connection engine implemented algorithm for applying block equivalence rules in the migration example of FIG. 2 according to an example embodiment.

The following are the block equivalence rules used by the migration connection engine as applied to the example in FIG. 2A, as shown in FIG. 3. The migration connection engine uses these rules to provide ease of connection logic of a source domain system to a targeted domain system with minimal effort. Logical concepts are mapped, not data values:
  Rule 1:
    Traverse all the blocks at 305.
    Search for Analog Input block at 310.
    If found modify the connection information at 315.
    Add DataAcquisition in algorithm block: block which has name as CMName at 320.
    Add connection information in DataAcq block at 325.
  Rule 2:
    If there is no connection for AI block and CM=Block and Block type=AI then add DataAcq block at 330.
  Rule 3:
    Fan Out can be applied only to control system block (say RegCtl), which can give more than one output as indicated at 335. A FANOUT control block (FIG. 6) may have one input, and fan that input out to five other blocks, such as various analog output blocks. Multiple FANOUT blocks may be used if required to provide more outputs than a single FANOUT block may be capable of providing. In one embodiment, a FANOUT block may have eight outputs.

Figure 4:
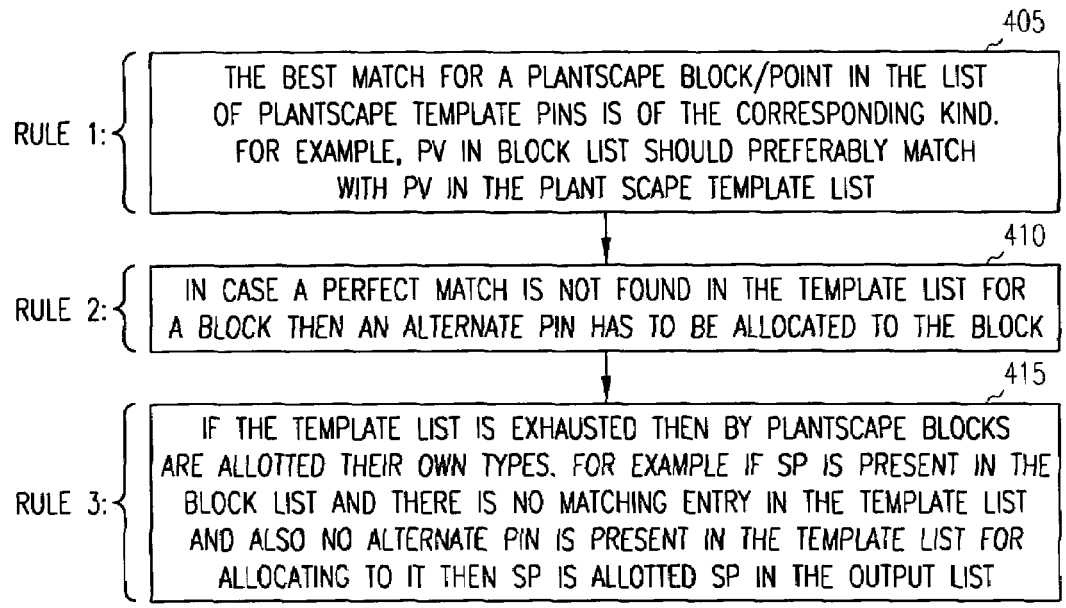
FIG. 4 is flow chart of an algorithm for applying pin connection rules in the migration example of FIG. 2 according to an example embodiment.

After the block equivalence rules are applied, the pins, corresponding to physical or logical connections between blocks are applied. Older systems may keep connection information in either a receiving block, or a connecting block, or in both. The information generally includes a name and type for the pin and connected to and connected from information. New systems may only keep connection information in a receiving end of a block. Pin connection rules for the above example are shown in FIG. 4:
  Rule 1:
    The best match for a PlantScape block/point in the list of PlantScape template pins is of the corresponding kind. For example, PV in block list should preferably match with PV in the PlantScape template list. (405)
  Rule 2:
    In case a perfect match is not found in the template list for a block then an alternate pin has to be allocated to the block. (410)
  Rule 3:
    If the template list is exhausted then by default PlantScape blocks are allotted their own types. For example if SP is present in the block list and there is no matching entry in the template list and also no alternate pin is present in the template list for allocating to it then SP is allotted SP in the output list. (415)

Figure 5:
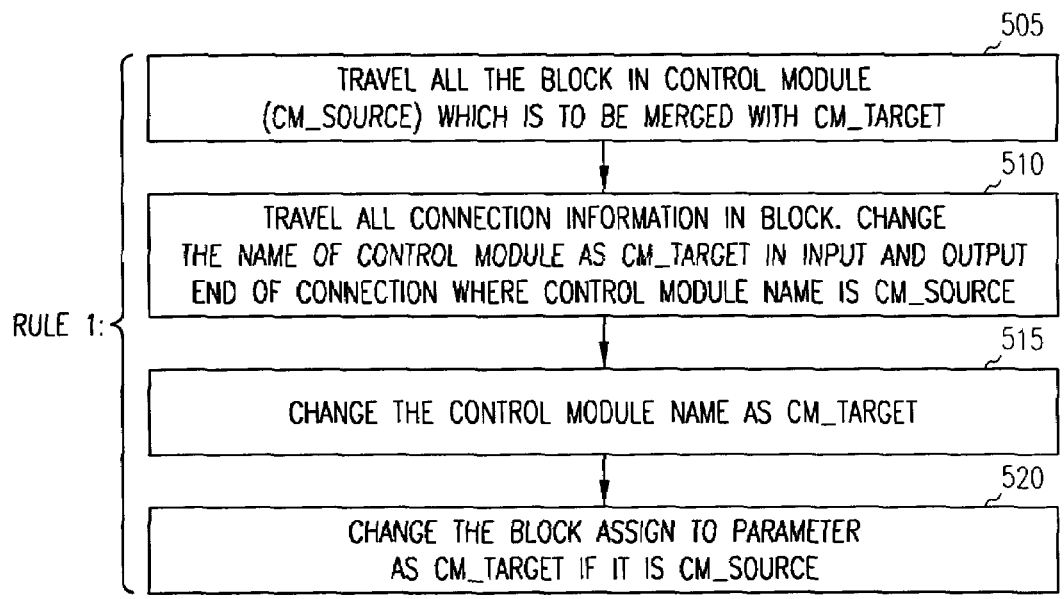
FIG. 5 is a flow chart of an algorithm for applying merge rules in a migration process according to an example embodiment.

Further rules, referred to as merge rules may be applied to potentially reduce the number of blocks required after the migration. In the above, example, the merge rules are not required. The following describe one embodiment of merge rules as shown in FIG. 5:
  Rule 1:
    Travel all the block in control module (CM_source) which is to be merged with CM target. (505)
    Travel all connection information in Block.Change the name of Control module as CM_target in Input and Output End of connection where Control module name is CM_source. (510)
    Change the Control Module name as CM_target. (515)
    Change the block AssignTo parameter as CM_target if it is CM_source. (520)

The following describes information regarding the blocks in a old system to be migrated to a new system. In this embodiment, the old system is expressed as TDC EB Files. For example some block could be expressed as:
{SYSTEM ENTITY 87FI654( )} (block 210)
&T ANINNIM
&N 87FI654
NODETYP=HPM
PNTFORM=COMPONNT
PTDESC="HOT PRCS H2O TO 87D-13"
EUDESC="USGPM 87FI654 ANINNIM"
KEYWORD="87D-13"
ASSOCDSP="87T_13"
$CDETAIL=" "
UNIT=05
NTWKNUM=06
NODENUM=5
MODNUM=5
SLOTNUM=2
PNTMODTY=HLAI
SENSRTYP=1_5_V
PVCHAR=SQRROOT
INPTDIR=DIRECT
PVEUHI=400.0000

```
PVEULO=0.000000
PVFORMAT=D1
PVEXEUHI=427.6000
PVEXEULO=-27.6000
PVCLAMP=NOCLAMP
LOCUTOFF=--------
TF=0.000000
{SYSTEM ENTITY 87FIC654( )} (block 215)
&T REGCLNIM
&N 87FIC654B
NODETYP=HPM
PNTFORM=FULL
PTDESC="HOT PRCS H20 TO 87D-13"
EUDESC="USGPM 87FIC654 REGCLNIM"
KEYWORD="87D-13"
ASSOCDSP="87T__13"
$CDETAIL=" "
UNIT=05
NTWKNM=06
NODENUM=5
MODNUM=0
SLOTNUM=6
PRIMMOD=87T__13
USERID="----------------"
CTLALGID=PID
PVEUHI=400.0000
PVEULO=0.000000
PVFORMAT=D1
PVSRCOPT=ONLYAUTO
OVERVAL=25
BADCTLOP=SHEDHOLD
RCASOPT=NONE
NMODE=AUTO
NMODATTR=OPERATOR
MODEPERM=PERMIT
EXTSWOPT=NONE
SPHILM=400.0000
SPLOLM=0.000000
$SPTOL=0.000000
SP=0.000000
SPOPT=NONE
RBOPT=NORATBI
PIDFORM=INTERACT
CTLEQN=EQB
PVTRACK=TRACK
CTLACTN=REVERSE
GAINOPT=LIN
K=1.000000
T1=0.100000
T2=0.000000
NOCINPTS=1
CISRC(1)=87FI654.PV
NOCOPTS=0
OPHILM=105.0000
OPLOLM=-5.00000
SAFEOP=--------
OPMCHLM=0.000000
OPROCLM=--------
$OPTOL=0.000000
OUTIND=DIRECT
$AUXUNIT=--
$ALDLOPT=NONE
DLYTIME=0
BADOCOPT=OFF
OPALDB=5.000000
OPHITP=--------
OPLOTP=--------
PVALDB=ONE
PVHITP=100.0000
PVHIPR=NOACTION
PVLOTP=--------
PVHHTP=265.0000
PVHHPR=NOACTION
PVSGCHTP=--------
PVROCPTP=--------
PVROCNTP=--------
BADPVPR=NOACTION
DEVHITP=--------
DEVLOTP=--------
ALENBST=ENABLE
```

The above EB file is then parsed by an EB parser to format the information for inclusion in a tool database. The result is as follows, with bold and italics used in formatting to separate parameters of blocks 210 and 215:

```
&T ANINNIM (Block 210)
&N 87FI654
MODNUM=5
SLOTNUM=2
PNTMODTY=HLAI
&TREGCLNIM (Block 215)
&N 87FIC654B
CTLALGID=PID
NOCINPTS=1
CISRC(1)=87FI654.PV
NOCOPTS=0
ALENBST=ENABLE
```

The connection engine is then used to apply the block equivalence rules:

&T ANINNIM
&N 87FI654
Finds equivalent blocks for destination DCS.
    AICHANNEL+
    DATAACQ.
&T REGCLNIM
&N87FIC654B
Finds equivalent blocks for destination DCS.
    REGCTL:PID It makes same connection without loss of connectivity and its meaning.
TPS connection
87FIC654B.PV=87FI654.PV
EPKS
DATAACQ.P1=87FI654.PV
87FIC654B.PV=DATAACQ.PV Pin configuration rules are then applied to adjust the proper pin connection while making connections. Merge rules are not applied in this example.

Figure 6:
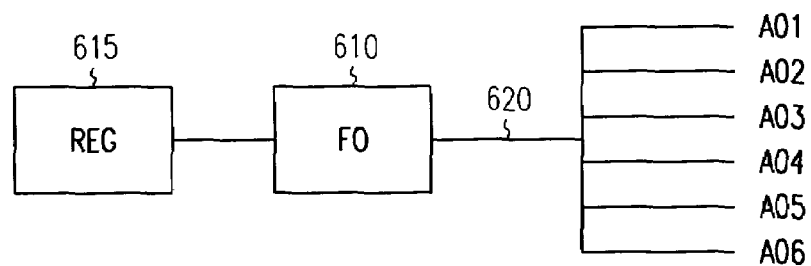
FIG. 6 is a block diagram illustrating a FANOUT block according to an example embodiment.

An example of use of a FANOUT block 610 is illustrated in FIG. 6. It is coupled to the output of a regulatory control block 615. In a source system, the regulatory control block may be able to drive several analog outputs. However, in some new systems, or destination systems, a regulatory control block may only provide a single output. FANOUT block 610 takes the output of such a regulatory control block 615 and provides several outputs 620, labeled AO1, AO2, AO3, AO4, AO5 and AO6.

Figure 7:
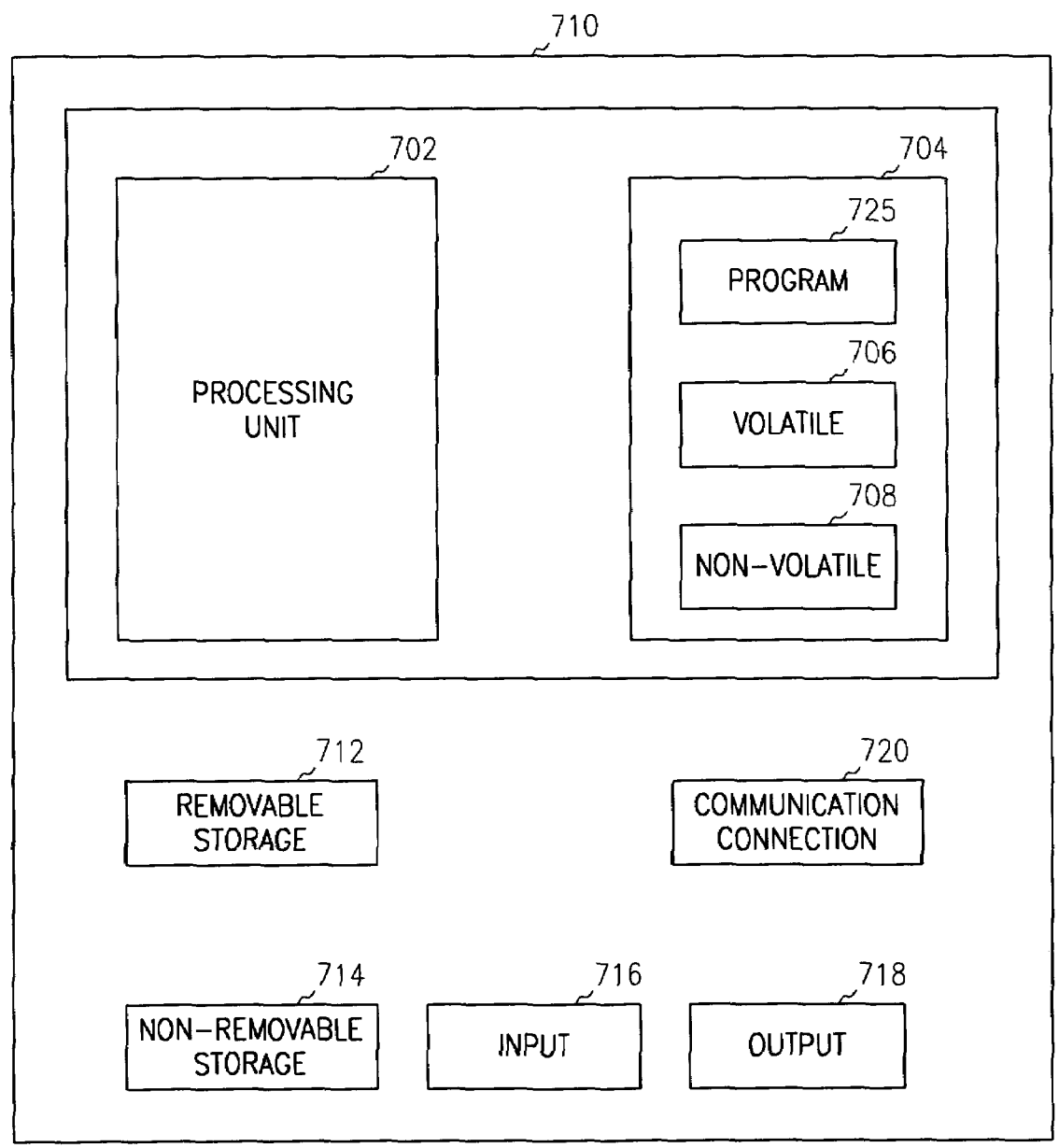
FIG. 7 is a block diagram of a computer system for implementing algorithms according to an example embodiment.

A block diagram of a computer system that executes programming for performing the above algorithm is shown in FIG. 7. A general computing device in the form of a computer 710, may include a processing unit 702, memory 704, removable storage 712, and non-removable storage 714. Memory 704 may include volatile memory 706 and non-volatile memory 708. Computer 710 may include—or have access to a computing environment that includes—a variety of computer-readable media, such as volatile memory 706 and non-volatile memory 708, removable storage 712 and non-removable storage 714. Computer storage includes random access memory (RAM), read only memory (ROM), eraseable programmable read-only memory (EPROM) & electrically eraseable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 710 may include or have access to a computing environment that includes input 716, output 718, and a communication connection 720. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 710. A hard drive, CD-ROM, and RAM are some examples of articles including a computer-readable medium. For example, a computer program 725 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer system 700 to provide generic access controls in a COM based computer network system having multiple users and servers.

Conclusion

Two main modules, the connection engine module (CEM) and block equivalence engine module (BEEM) provide connection logic between algorithmic block/points and support building a targeted domain. The migration connection engine is a flexible structure that helps migration process from a control system to a new system, such as PlantScape/Experion PKS. The connection engine provides flexibility in terms of rules which can be set, based on a control strategy being built. Each of the modules, BEEM and CEM follow certain rules based on which the migration of a textual representation of the old system is performed.

The basic flow of migration from one system to others is a journey involving an older or different system's raw system files to PS loop files. Raw files are control system configuration files, like EB files in the TDC system and .LIS files in an MxOpen System. While parsing the raw files, the connection engine is filled. Custom rules are applied over the filled connection engine. The rules are designed based on an in-depth knowledge of the new system, such as PlantScape Strategy building. Using PlantScape block templates, loops are generated as the connection engine is filled. Loop files can be updated for parameter values and other attributes of function blocks. While migration between two specific systems are discussed as examples, it is clear that the invention as claimed may be used to migrate between many different existing and future systems.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A migration system for distributed control system migration from an old source control system to a new destination system, the migration system comprising:
    a parser that parses system configuration information for the old source control system into an intermediate form; and
    a functional block equivalence module that finds new destination system control blocks that are equivalent to source system control blocks and builds logical control loops using the destination system control blocks.

2. The migration system of claim 1, wherein the intermediate form comprises a database of intermediate translations of the configuration information.

3. The migration system of claim 1 wherein a source system control block is migrated to combination of two or more destination system control blocks.

4. The migration system of claim 3 wherein an analog input block in the source system is converted to an analog input block and a data acquisition block in the destination system.

5. The migration system of claim 1 wherein selected source system control blocks have integrated alarms feature, and wherein such control blocks are migrated to control blocks with separate alarms blocks as supported by the destination system.

6. The migration system of claim 1 wherein destination system blocks include FANOUT blocks.

7. The migration system of claim 6 wherein the FANOUT blocks provide up to eight outputs for an input as supported by the destination system.

8. The migration system of claim 6 wherein FANOUT blocks are only applied to outputs of an algorithmic control block such as regulatory control blocks.

9. The migration system of claim 8 wherein multiple analog output blocks may be coupled to the outputs of a FANOUT block.

10. The migration system of claim 1 wherein the block equivalence module implements rules for correlating function objects characterizing a plurality of system configuration algorithms between the source system and the destination system.

11. The migration system of claim 1 wherein the source system and destination system are distributed control systems.

12. The migration system of claim 1 and further comprising a pin matching module that matches pins for connecting the target system control blocks.

13. The migration system of claim 12 wherein pins are matched with corresponding pins in the source and destination control blocks.

14. The migration system of claim 13 wherein alternate pins may be selected.

15. The migration system of claim 1 and further comprising a merge module for merging control blocks in the destination system control blocks.

16. A computer implemented method of migrating from an old source control system to a new destination control system, the method comprising:
    parsing system configuration information for the old source control system into an intermediate language;
    converting source system functional control blocks to destination system functional control blocks that are equivalent to the source system control blocks; and
    building logical control loops using the destination system control blocks.

17. The method of claim 16 wherein a source system control block is migrated to combination of two or more destination system control blocks.

18. The method of claim 17 wherein an analog input block in the source system is convened to an analog input block and a data acquisition block in the destination system.

19. The method of claim 16 wherein selected source system control blocks have integrated alarms feature, and wherein such control blocks are migrated to control blocks with separate alarms blocks.

20. A physical computer readable medium having instructions for causing a computer to implement a method of migrating from an old source control system to a new destination control system, the method comprising:

parsing system configuration information for the old source control system into an intermediate language;

converting source system control blocks to destination system control blocks that are equivalent to the source system control blocks; and building logical control loops using the destination system control blocks.

\* \* \* \* \*